US010693626B2

(12) United States Patent
Ren et al.

(10) Patent No.: US 10,693,626 B2
(45) Date of Patent: Jun. 23, 2020

(54) METHOD AND SYSTEM FOR GENERATING/DECRYPTING CIPHERTEXT, AND METHOD AND SYSTEM FOR SEARCHING CIPHERTEXTS IN A DATABASE

(71) Applicant: AGENCY FOR SCIENCE, TECHNOLOGY AND RESEARCH, Singapore (SG)

(72) Inventors: Shuqin Ren, Singapore (SG); Benjamin Hong Meng Tan, Singapore (SG); Khin Mi Mi Aung, Singapore (SG); Sivaraman Sundaram, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 124 days.

(21) Appl. No.: 15/306,072

(22) PCT Filed: Apr. 23, 2015

(86) PCT No.: PCT/SG2015/050081
§ 371 (c)(1),
(2) Date: Oct. 21, 2016

(87) PCT Pub. No.: WO2015/163822
PCT Pub. Date: Oct. 29, 2015

(65) Prior Publication Data
US 2017/0048058 A1    Feb. 16, 2017

(30) Foreign Application Priority Data
Apr. 23, 2014   (SG) ............................ 10201401730T

(51) Int. Cl.
*H04L 29/06* (2006.01)
*H04L 9/00* (2006.01)
(Continued)

(52) U.S. Cl.
CPC ............ *H04L 9/008* (2013.01); *H04L 9/0618* (2013.01); *H04L 9/30* (2013.01); *H04L 2209/08* (2013.01)

(58) Field of Classification Search
CPC ......... H04L 9/008; H04L 9/0618; H04L 9/30; H04L 2209/08
See application file for complete search history.

(56) References Cited

U.S. PATENT DOCUMENTS 6,813,354 B1 * 11/2004 Jakobsson ............. H04L 9/3013
                                                      380/37
7,006,999 B1 *  2/2006 Huberman ............. G06Q 10/10
                                                      705/50
(Continued)

FOREIGN PATENT DOCUMENTS

WO    WO 2013/188929 A1    12/2013

OTHER PUBLICATIONS

Lagendijk et al., Encrypted Signal Processing for Privacy Protection, IEEE, Jan. 2013.*
(Continued)

*Primary Examiner* — David Garcia Cervetti
(74) *Attorney, Agent, or Firm* — Womble Bond Dickinson (US) LLP

(57) ABSTRACT

There is provided a method of generating a ciphertext. The method includes encrypting an input data to produce an encrypted data, and randomizing the encrypted data to produce the ciphertext. In particular, the randomizing process includes performing an exclusive-or (xor) operation on the encrypted data with a cipher pad, whereby the cipher pad
(Continued)

is generated based on an xor-homomorphic function of a first key using a second key generated based on the encrypted data. There is also provided a corresponding system for generating a ciphertext, a corresponding method and system for decrypting a ciphertext, and a corresponding method and system for searching ciphertexts in a database, such as at an untrusted server.

10 Claims, 14 Drawing Sheets

(51) Int. Cl.
*H04L 9/30* (2006.01)
*H04L 9/06* (2006.01)

(56) References Cited

U.S. PATENT DOCUMENTS

| | | | | |
|---|---|---|---|---|
| 8,515,058 | B1* | 8/2013 | Gentry | H04L 9/008 380/28 |
| 8,904,171 | B2* | 12/2014 | Clifton | G06F 21/6227 713/167 |
| 9,009,089 | B1* | 4/2015 | El Defrawy | G06F 16/90344 706/18 |
| 9,442,980 | B1* | 9/2016 | Trepetin | G06F 21/6254 |
| 9,621,346 | B2* | 4/2017 | Gentry | H04L 9/008 |
| 9,641,332 | B1* | 5/2017 | Yung | H04L 9/30 |
| 9,646,166 | B2* | 5/2017 | Cash | G06F 21/602 |
| 9,742,566 | B2* | 8/2017 | Gentry | H04L 9/008 |
| 9,852,306 | B2* | 12/2017 | Cash | G06F 21/6227 |
| 9,871,652 | B2* | 1/2018 | Morikawa | H04L 9/008 |
| 9,892,211 | B2* | 2/2018 | Yoshino | H04L 9/008 |
| 9,893,880 | B2* | 2/2018 | Rohloff | H04L 9/008 |
| 2004/0131186 | A1* | 7/2004 | Kasuya | H04L 9/0662 380/255 |
| 2007/0116283 | A1* | 5/2007 | Tuyls | H04L 9/3013 380/255 |
| 2010/0146299 | A1* | 6/2010 | Swaminathan | G06F 21/6227 713/189 |
| 2011/0110525 | A1* | 5/2011 | Gentry | H04L 9/0822 380/285 |
| 2011/0211692 | A1* | 9/2011 | Raykova | H04L 9/008 380/46 |
| 2011/0264920 | A1* | 10/2011 | Rieffel | H04L 9/008 713/189 |
| 2012/0002811 | A1* | 1/2012 | Smart | H04L 9/085 380/255 |
| 2013/0010950 | A1* | 1/2013 | Kerschbaum | H04L 9/008 380/30 |
| 2013/0166080 | A1* | 6/2013 | Furuta | G05B 15/02 700/286 |
| 2013/0170640 | A1* | 7/2013 | Gentry | H04L 9/008 380/30 |
| 2013/0191650 | A1* | 7/2013 | Balakrishnan | G06F 21/6227 713/190 |
| 2013/0216044 | A1* | 8/2013 | Gentry | H04L 9/008 380/277 |
| 2013/0262863 | A1* | 10/2013 | Yoshino | H04L 9/008 713/165 |
| 2013/0329883 | A1* | 12/2013 | Tamayo-Rios | H04L 9/008 380/28 |
| 2013/0333024 | A1* | 12/2013 | Takenouchi | H04L 9/0662 726/19 |
| 2013/0333051 | A1* | 12/2013 | Takenouchi | H04L 9/0662 726/26 |
| 2014/0172830 | A1* | 6/2014 | Yoshino | G06F 21/6227 707/722 |
| 2014/0185794 | A1* | 7/2014 | Yasuda | H04L 9/008 380/28 |
| 2014/0233727 | A1* | 8/2014 | Rohloff | G06F 16/3347 380/28 |
| 2014/0233728 | A1* | 8/2014 | Rohloff | H04L 9/008 380/28 |
| 2014/0237254 | A1* | 8/2014 | Joye | H04L 9/32 713/176 |
| 2015/0046450 | A1* | 2/2015 | Yoshino | H04L 9/008 707/736 |
| 2015/0100785 | A1* | 4/2015 | Joye | H04L 9/008 713/168 |
| 2015/0215123 | A1* | 7/2015 | Kipnis | H04L 9/002 380/46 |
| 2015/0270967 | A1* | 9/2015 | Susella | H04L 9/3093 380/30 |
| 2015/0295716 | A1* | 10/2015 | Liu | H04L 9/008 713/191 |
| 2015/0365229 | A1* | 12/2015 | Patey | H04L 9/008 380/30 |
| 2015/0365239 | A1* | 12/2015 | Gajek | H04L 9/008 380/282 |
| 2016/0004874 | A1* | 1/2016 | Ioannidis | H04L 9/008 713/165 |
| 2016/0234010 | A1* | 8/2016 | Kipnis | H04L 9/065 |
| 2016/0275308 | A1* | 9/2016 | Hubaux | G06F 21/6245 |

OTHER PUBLICATIONS

Shu Qin Ren et al., Homomorphic Exclusive-or Operation Enhance Secure Searching on Cloud Storage, IEEE, Dec. 2014.*
Carlos Aguilar Melchor et al., Recent Advances in Homomorphic Encryption, IEEE, Mar. 2013.*
Ren et al., Homomorphic Exclusive-or Operation Enhance Secure Searching on Cloud Storage, IEEE, 2014.*
Lu et al., Confidentiality-Preserving Image Search: A Comparative Study Between Homomorphic Encryption and Distance-Preserving Randomization, IEEE, Jan. 2014.*
Claude Castelluccia, Aldar C-F. Chan, Einar Mykletun, and Gene Tsudik. 2009. Efficient and provably secure aggregation of encrypted data in wireless sensor networks. ACM Trans. Sen. Netw. 5, 3, Article 20 (Jun. 2009), 36 pages.*
PCT International Search Report for PCT Counterpart Application No. PCT/SG2015/050081, 4 pgs. (dated Jun. 11, 2005).
PCT Written Opinion of the International Searching Authority for PCT Application No. PCT/SG2015/050081, 4 pgs. (dated Jun. 11, 2015).
PCT Notification Concerning Transmittal of International Preliminary Report on Patentability (Chapter I of the Patent Cooperation Treaty) for PCT Counterpart Application No. PCT/SG2015/050081, 6 pp., (dated Nov. 3, 2016).
Dawn Xiaodong Song, et al., "Practical Techniques for Searches on Encrypted Data", in Proc. of IEEE Symposium on Security and Privacy, 12 pp., (2000).

* cited by examiner

Searching for Merck's
Encryption of search keyword:
0x7d23494f74cf15e5add01e57c54e8e7218aee63
search time taken:20032
word Merck's found at location 10000

Searching for Merck's
Encryption of search keyword:
0x7d23494f74cf15e5add01e57c54e8e7218aee63
search time taken:20036
word Merck's found at location 10000

Searching for Merck's
Encryption of search keyword:
0xa91b33e161b25caa92f89b5a2e7272d1484f0c2
found match
search time taken:13955
word Merck's found at location 10000

Searching for Merck's
Encryption of search keyword:
0x72fc91dd4f0e66f775982a80b65e45627d1844
found match
search time taken:13958
word Merck's found at location 10000

METHOD AND SYSTEM FOR GENERATING/DECRYPTING CIPHERTEXT, AND METHOD AND SYSTEM FOR SEARCHING CIPHERTEXTS IN A DATABASE

CROSS-REFERENCE TO RELATED APPLICATIONS

This patent application is a U.S. National Phase Application under 35 U.S.C. § 371 of International Application No. PCT/SG2015/050081, file on 23 Apr. 2015, entitled METHOD AND SYSTEM FOR GENERATING/DECRYPTING CIPHERTEXT, AND METHOD AND SYSTEM FOR SEARCHING CIPHERTEXTS IN A DATABASE, which claims the benefit of priority of Singapore Patent Application No. 10201401730T, filed on 23 Apr. 2014, the content of which was incorporated by reference in its entirety for all purposes.

TECHNICAL FIELD

The present invention generally relates to a method and a system for generating a ciphertext, a method and a system for decrypting a ciphertext (e.g., at a trusted or local site), and a method and a system for searching ciphertexts in a database (e.g., at an untrusted and shared storage service site), and more particularly, based on an exclusive-or (xor) homomorphic function.

BACKGROUND

Conventional security mechanisms, such as Advanced Encryption Standard (AES), e.g., AES-128, AES-192 and AES-256 specified by the National Institute of Standards and Technology (NIST) and used worldwide, target on data confidentiality by encryption of electronic data. The encrypted data are dump data, meaning that they cannot support any management required functions such as searching, statistical analysis or comparing. These schemes are not suitable for organizations to outsource data management on untrusted servers since they do not support searching functionality on encrypted data. There exist encryption mechanisms which support searching on encrypted data, such as deterministic (DET) encryption for equality checking, order-preserving encryption (OPE) for range checking, homomorphic encryption (HOM) for secure data update and so on. However, there are various problems associated with such encryption mechanisms. For example, ciphertext with DET may leak access pattern and thus has the potential to leak data, OPE may leak the order of data, existing HOM mechanism involves high computational complexity, which may be too expensive to put into practice.

A need therefore exists to provide a method and a system for generating a ciphertext, a method and a system for decrypting a ciphertext, and a method and a system for searching ciphertexts in a database that seek to overcome, or at least ameliorate, one or more of the deficiencies in conventional methods and systems. It is against this background that the present invention has been developed.

SUMMARY

According to a first aspect of the present invention, there is provided a method of generating a ciphertext, the method comprising:

encrypting an input data to produce an encrypted data; and randomizing the encrypted data to produce the ciphertext,
wherein said randomizing comprises performing an exclusive-or (xor) operation on the encrypted data with a cipher pad, and wherein the cipher pad is generated based on an xor-homomorphic function of a first key using a second key generated based on the encrypted data.

Preferably, the cipher pad comprises the first key and an output of the xor-homomorphic function of the first key.

Preferably, the first key is a session key for the input data, the session key being a pseudorandom number.

Preferably, the xor-homomorphic function is a pseudorandom bit-permutation function or a circular shift function.

Preferably, the second key for the xor-homomorphic function is generated based on a hash function or a circular shift function of a portion of the encrypted data.

In an embodiment, said performing an xor operation on the encrypted data with a cipher pad comprises performing a first xor operation on a first portion of the encrypted data with the first key to produce a first portion of the ciphertext, and performing a second xor operation on a second portion of the encrypted data with the output of the xor-homomorphic function of the first key to produce a second portion of the ciphertext, and wherein the second key for the xor-homomorphic function is generated based the first portion of the ciphertext.

Preferably, the second key for the xor-homomorphic function is generated based on a hash function or a circular shift function of the first portion of the ciphertext.

According to a second aspect of the present invention, there is provided a system for generating a ciphertext, the system comprising:

an encryptor configured to encrypt an input data to produce an encrypted data; and a randomizer configure to randomize the encrypted data to produce the ciphertext,
wherein the randomizer is configured to perform an exclusive-or (xor) operation on the encrypted data with a cipher pad, and wherein the cipher pad is generated based on an xor-homomorphic function of a first key using a second key generated based on the encrypted data.

Preferably, the cipher pad comprises the first key and an output of the first xor-homomorphic function of the first key.

Preferably, the first key is a session key for the input data, the session key being a pseudorandom number.

Preferably, the xor-homomorphic function is a pseudorandom bit-permutation function or a circular shift function.

Preferably, the second key for the xor-homomorphic function is generated based on a hash function or a circular shift function of a portion of the encrypted data.

In an embodiment, the randomizer is configured to perform a first xor operation on a first portion of the encrypted data with the first key to produce a first portion of the ciphertext, and configured to perform a second xor operation on a second portion of the encrypted data with the output of the xor-homomorphic function of the first key to produce a second portion of the ciphertext, and wherein the second key for the xor-homomorphic function is generated based the first portion of the ciphertext.

Preferably, the second key for the xor-homomorphic function is generated based on a hash function or a circular shift function of the first portion of the ciphertext.

According to a third aspect of the present invention, there is provided a method of decrypting a ciphertext to recover an original data, the method comprising:

deciphering the ciphertext to recover an encrypted data; and decrypting the encrypted data to recover the original data, wherein said deciphering comprises performing a first exclusive-or (xor) operation on a first portion of the ciphertext with a first key to recover a first portion of the encrypted data, and performing a second xor operation on a second portion of the ciphertext with an output of a first xor-homomorphic function of the first key using a second key generated based on the first portion of the encrypted data to recover a second portion of the encrypted data.

According to a fourth aspect of the present invention, there is provided a system for decrypting a ciphertext to recover an original data, the system comprising:

a decipher module configured to decipher the ciphertext to recover an encrypted data; and a decryptor configured to decrypt the encrypted data to recover the original data, wherein the decipher module is configured to perform a first exclusive-or (xor) operation on a first portion of the ciphertext with a first key to recover a first portion of the encrypted data, and performing a second xor operation on a second portion of the ciphertext with an output of a first xor-homomorphic function of the first key using a second key generated based on the first portion of the encrypted data to recover a second portion of the encrypted data.

According to a fifth aspect of the present invention, there is provided a method of searching ciphertexts in a database, the method comprising:

encrypting a search keyword to produce an encrypted search keyword;

randomizing the encrypted search keyword to produce a ciphered search keyword; and searching the ciphertexts in the database for a match with the ciphered search keyword, wherein said randomizing comprises performing an exclusive-or (xor) operation on the encrypted search keyword with a cipher pad, and wherein the cipher pad is generated based on an xor-homomorphic function of a first key using a second key generated based on the encrypted search keyword, and wherein said searching comprises performing an xor operation on the ciphertexts in the database with the ciphered search keyword to determine whether there is a match.

According to a sixth aspect of the present invention, there is provided a system for searching ciphertexts in a database, the system comprising:

an encryptor configured to encrypt a search keyword to produce an encrypted search keyword;

a randomizer configured to randomize the encrypted search keyword to produce a ciphered search keyword; and a search module configured to search the ciphertexts in the database for a match with the ciphered search keyword, wherein the randomizer is configured to perform an exclusive-or (xor) operation on the encrypted search keyword with a cipher pad, and wherein the cipher pad is generated based on an xor-homomorphic function of a first key using a second key generated based on the encrypted search keyword, and wherein the search module is configured to perform an xor operation on the ciphertexts in the database with the ciphered search keyword to determine whether there is a match.

According to a seventh aspect of the present invention, there is provided a computer program product, embodied in a computer-readable storage medium, comprising instructions executable by a computer processor to perform a method of generating a ciphertext according to the first aspect of the present invention.

According to an eighth aspect of the present invention, there is provided a computer program product, embodied in a computer-readable storage medium, comprising instructions executable by a computer processor to perform a method of searching ciphertext in a database according to the fifth aspect of the present invention.

BRIEF DESCRIPTION OF THE DRAWINGS

Embodiments of the present invention will be better understood and readily apparent to one of ordinary skill in the art from the following written description, by way of example only, and in conjunction with the drawings, in which:

FIG. 14 depicts a schematic block diagram of an exemplary computer system capable of implementing the methods according to various embodiments of the present invention; and.

FIGS. 15A and 15B depict the results on an experiment conducted to compare the performance of a conventional method of searching ciphertexts and a method of searching ciphertexts in a database according to an example embodiment of the present invention.

DETAILED DESCRIPTION

Embodiments of the present invention provide a method of generating a ciphertext based on an exclusive-or (xor) homomorphic function which advantageously prevent man-in-the-middle (MITM) attacks, while maintaining search flexibility on the ciphertext. In particular, the use of xor-homomorphic functions provide the ability to search the ciphertexts without having to decipher the ciphertexts to reveal their contents, and the use of session randomization guards access pattern (e.g., access frequency) from being revealed to eavesdropper, thus significantly enhancing data security and privacy. Accordingly, a lightweight secure searching mechanism on ciphertexts on a server can be provided without leaking data confidentiality or data access pattern.

Figure 1:
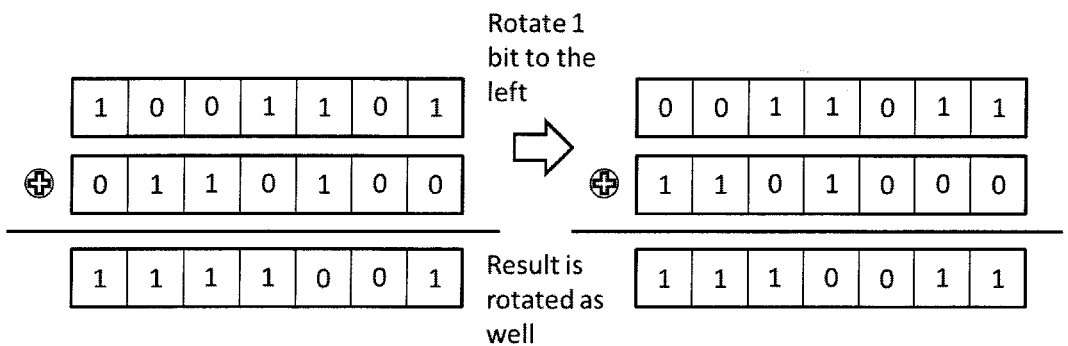
FIG. 1 depicts a schematic block diagram illustrating the definition of xor-homomorphic functions by way of an example.

FIG. 1 depicts a schematic block diagram illustrating the definition of xor-homomorphic functions by way of an example. Xor-homomorphism refers to the property of certain functions which preserve the structure of the xor ($\oplus$) operation on the input set. In particular, for a xor-homomorphic function $f$ and inputs $x_1$ and $x_2$, the following equation should be satisfied:

$$f(x_1 \oplus x_2) = f(x_1) \oplus f(x_2) \qquad \text{Equation (1)}$$

That is, the xor of the inputs $x_1$ and $x_2$ when passed through the function $f$ (i.e., $f(x_1 \oplus x_2)$) should be equal to the xor of the output of the function $f$ on each of the inputs $x_1$ and $x_2$ (i.e., $f(x_1) \oplus f(x_2)$). Therefore, embodiments of the present invention advantageously utilize the xor-homomorphic function $f$ to preserve special characteristics in the data structure after randomization so as to enable searching of the ciphertexts on a server, including an untrusted server, without having to reveal their contents.

Figure 2:
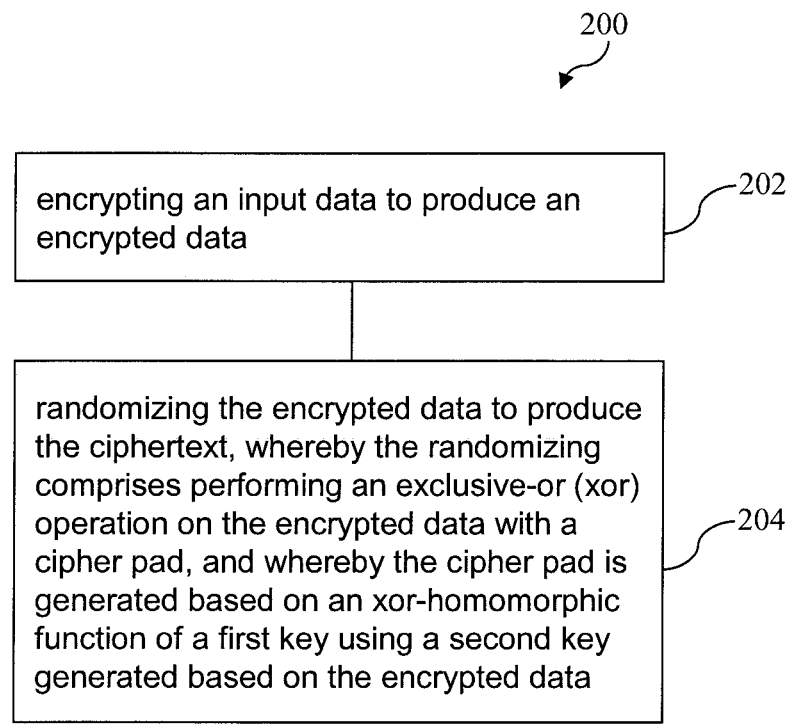
FIG. 2 depicts an overview of a method of generating a ciphertext according to an embodiment of the present invention.

FIG. 2 depicts an overview of a method 200 of generating a ciphertext according to an embodiment of the present invention. The method 200 comprising a step 202 of encrypting an input data to produce an encrypted data, and a step 204 of randomizing the encrypted data to produce the ciphertext. In particular, the randomizing process comprises performing an exclusive-or (xor) operation on the encrypted data with a cipher pad (or a permutation key pad), whereby the cipher pad is generated based on an xor-homomorphic function of a first key using a second key generated based on the encrypted data. In an example embodiment, the xor-homomorphic function may have two inputs, a pseudorandom number (first key) and a permutation key (second key). The permutation key is preferably bounded with a left part/portion of the encrypted data, as will be described later in example embodiments of the present invention. Thus, the information shared with servers, e.g., untrusted servers can be reduced.

For a better understanding, the method 200 will now be described more fully with reference to FIG. 3, in which an exemplary embodiment of the invention is shown. This invention may, however, be embodied in many different forms and should not be construed as limited to the exemplary embodiment shown in FIG. 3. Rather, the exemplary embodiment is provided so that this disclosure will be thorough and complete, and will fully convey the scope of the invention to those skilled in the art.

Figure 3:
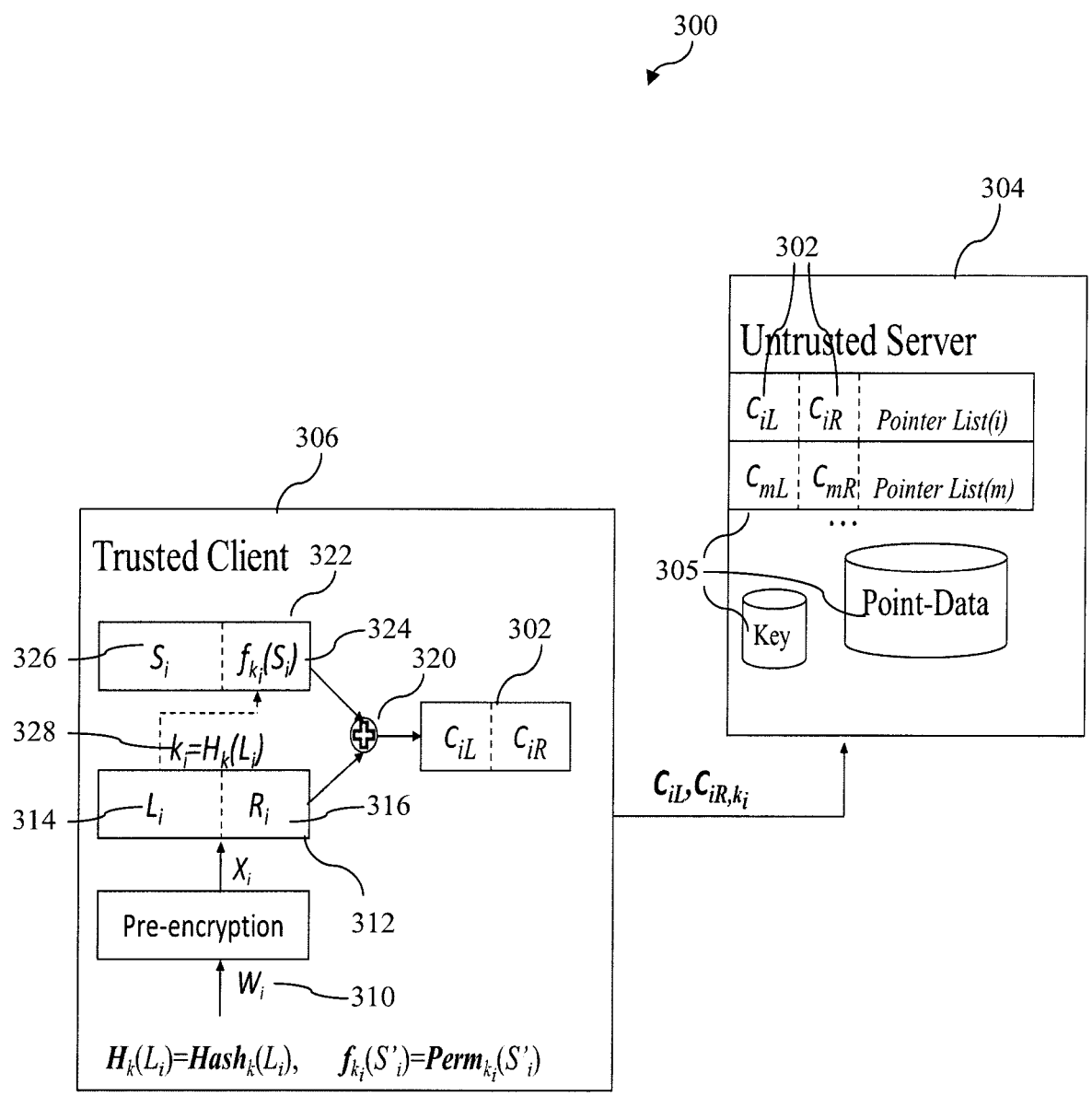
FIG. 3 depicts a schematic block diagram of an exemplary method of generating a ciphertext according to an example embodiment of the present invention.

FIG. 3 depicts a schematic block diagram of an exemplary method 300 of generating an n-bit ciphertext ($C_{iL}+C_{iR}$) 302 ($C_{iL}$ denoting the left most (n-m)-bit and $C_{iR}$ denoting the remaining or right m-bit) according to an example embodiment of the present invention and subsequently uploaded to a server 304. In the example embodiment, the ciphertext 302 is generated at a trusted client 306 and then uploaded to an untrusted server 304 to demonstrate the data security and privacy provided by the method 300. In particular, according to the example embodiment, two levels of data protection are implemented before any data is uploaded to the untrusted server 304, namely, encryption and randomization.

As a first step, the input data ($W_i$) 310 is encrypted to produce an encrypted data ($X_i$) 312, which is partitioned into a first or left (n-m)-bit portion ($L_i$) 314 and a second or right m-bit portion ($R_i$) 316. Subsequently, a relationship between the left and right portions will be built using xor homomorphic function. The encrypted data 312 is partitioned into two parts to facilitate in preserving the structure of the encrypted data after the randomizing process. Preferably, a deterministic symmetric encryption technique (e.g., AES-256) is used to secure the privacy of the data and ensure that the encrypted data is constant (i.e., the same ciphertext for a given plaintext and key), thus allowing the encrypted data 312 to be used in a part of the randomization process. The encrypted data 312 is then randomized to produce the ciphertext 302.

As illustrated in the example embodiment of FIG. 3, the randomization process includes performing an xor operation 320 on the encrypted data 312 with a cipher pad 322. The cipher pad 322 is generated based on an xor-homomorphic function (e.g., $f_{k_i}$) 324 of a first or session key (e.g., $S_i$) 326 using a second or permutation key (e.g., $k_i$) 328 generated based on the encrypted data 312. In the example embodiment, the cipher pad 322 comprises the first key 326 and the output of the xor-homomorphic function 324 of the first key 326 with the second key 328 serving as a seed. The first key 326 may be concatenated with the output of the xor-homomorphic function 324 of the first key 326. In various embodiments, the xor-homomorphic function 324 may be a pseudorandom bit-permutation function or a circular shift function. In the example embodiment of FIG. 3, the xor-homomorphic function 324 is a pseudorandom bit-permutation function ($Perm_{k_i}$). The first key 326 is a session key for the input data 310 and may be a pseudorandom number. The second key 328 is a permutation key for the xor-homomorphic function 324 and is preferably generated based on a hash function or a circular shift function of a portion of the encrypted data 312.

As illustrated in the example embodiment of FIG. 3, the second key 328 may be generated based on a hash function ($H_k$) of a (n-m)-bit left portion 314 of the n-bit encrypted data 312. For example, the hash function ($H_k$) can be a one-way function with a key k or pseudo random function with a random seed of k. The left portion 314 and the right portion 316 may have the same or different length. The length of the left portion 314 affects the collision of permutation key, whereby the longer the left portion 314 the less possibility of collision. Therefore, the length of the left portion 314 may be selected as appropriate. Accordingly, in the example embodiment, the cipher pad 322 may be created by hashing the left portion 314 of the encrypted data 312 to produce a permutation key (second key) 328 to be used in performing a pseudorandom bit-permutation on the session key (first key) 326, and the output of the pseudorandom bit-permutation function is concatenated with the session key 326.

After protecting the input data 310 to produce a ciphertext 302 as described above, the ciphertext 302 and the second key 328 are sent to an untrusted server 304 where they can be stored in a database 305 in, for example, tree-based structures for facilitating searching.

Figure 4A:
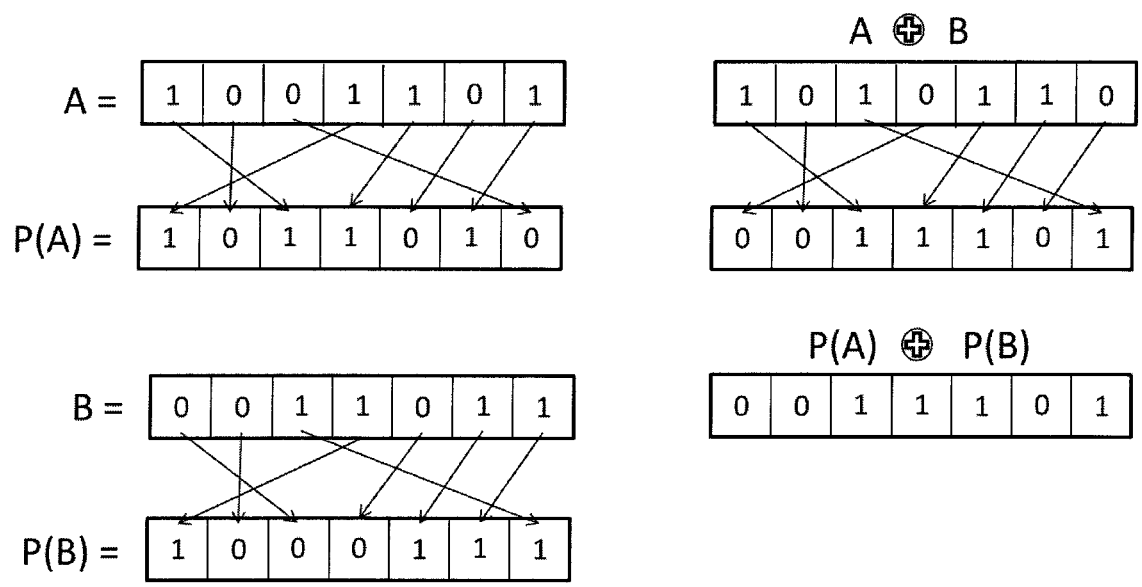
FIGS. 4A and 4B illustrate an example of a xor-homomorphic function based on bit-permutations.
Figure 4B:
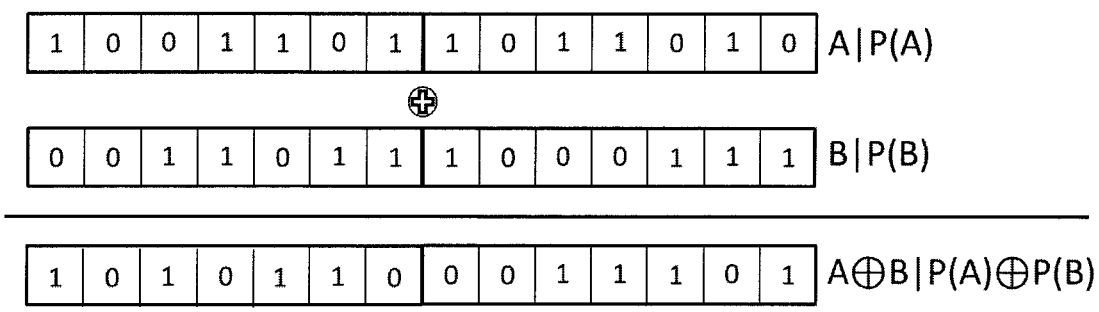

For illustration purposes only, FIGS. 4A and 4B depict schematic block diagrams showing an example of how xor-homomorphic functions may be used to preserve the special structure of a cipher pad 322 to be used in randomizing the encrypted data 312. The example is described with the xor-homomorphic function being a pseudorandom bit-permutation function. Preferably, the permutation is chosen to ensure that the randomization cannot be tampered with easily. In the example, the bit-permutation is chosen using the Knuth shuffle (also known as the Fisher-Yates shuffle), which will result in a random bit-permutation. FIG. 4A depicts a schematic block diagram illustrating the xor-homomorphism of bit-permutations. The left side of FIG. 4A shows the permutations on A and B to generate P(A) and P(B), respectively. The right side of FIG. 4B shows the xor of A and B followed by the permutation on A⊕B. From FIG. 4A, it can be seen that the permuted results of P(A⊕B) and P(A)⊕P(B) are the same, thus demonstrating the xor-homomorphic property.

To obtain the permutation key 328 without leaking any data information, the permutation key 328 is preferably associated with the left portion 314 of the encrypted data 312 as mentioned hereinbefore. For example, a pseudorandom number generator is used and seeded with a hash of the left portion 314 (i.e., the permutation key 328) as illustrated in FIG. 3. Thus, the permutation key 328 could be stored on untrusted servers 304 without leaking stored contents. FIG. 4B illustrates an exemplary cipher pad generated and its xor-homomorphic properties. In the first row, input 'A' is concatenated with P(A). In the second row, input 'B' is concatenated with P(B). In the third row, A⊕B is concatenated with P(A⊕B). From FIG. 4B, the xor-homomorphic property can be seen (i.e., the relationship P(A⊕B)=P(A)⊕P(B)), which advantageously supports secure searching according to embodiments of the present invention. The pseudorandom bit-permutation requires knowledge of the encrypted data. Since the encrypted data 312 is xor-ed with the cipher pad 322, it will not be easy to extract the required details from the ciphertext 302 uploaded to the server 304. This ensures that the randomization process cannot be easily forged by those without knowledge of the permutation key 328.

Figure 4C:
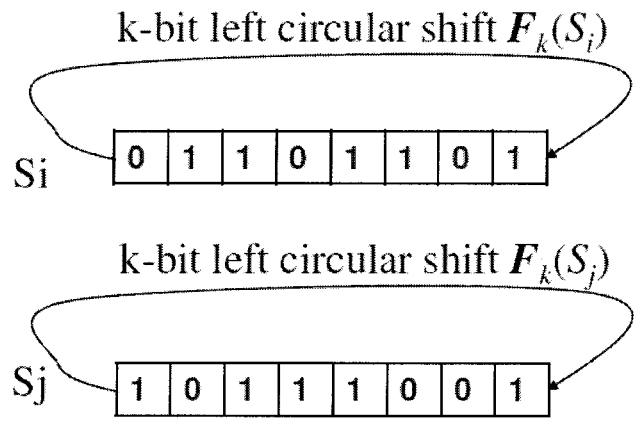
FIGS. 4C and 4D illustrate an example of the xor-homomorphic function based on circular shift.
Figure 4D:
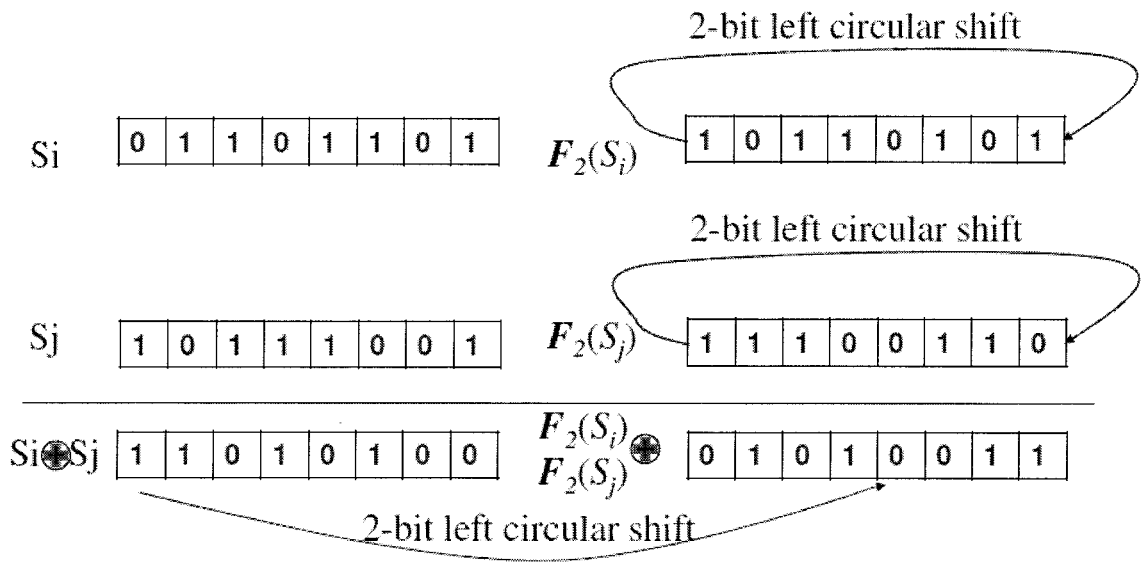

It will be appreciated to a person skilled in the art that the xor-homomorphic function is not limited to a pseudorandom bit-permutation function. For example, according to various embodiments, the xor-homomorphic function ($f_{k_i}$) may be a circular shift function ($Rot_{k_i}$). For illustration purposes only, FIGS. 4C and 4D illustrate the circular shift based xor-homomorphic functions. In particular, FIG. 4C illustrates the principle of xor-homomorphic function using circular shift, and FIG. 4D shows an example of a circular shift function F2(.) on input numbers Si and Sj. From FIG. 4D, it can be seen that $F_2(Si \oplus Sj) = F_2(Si) \oplus F_2(Sj)$, thus demonstrating the homomorphic property.

Figure 5:
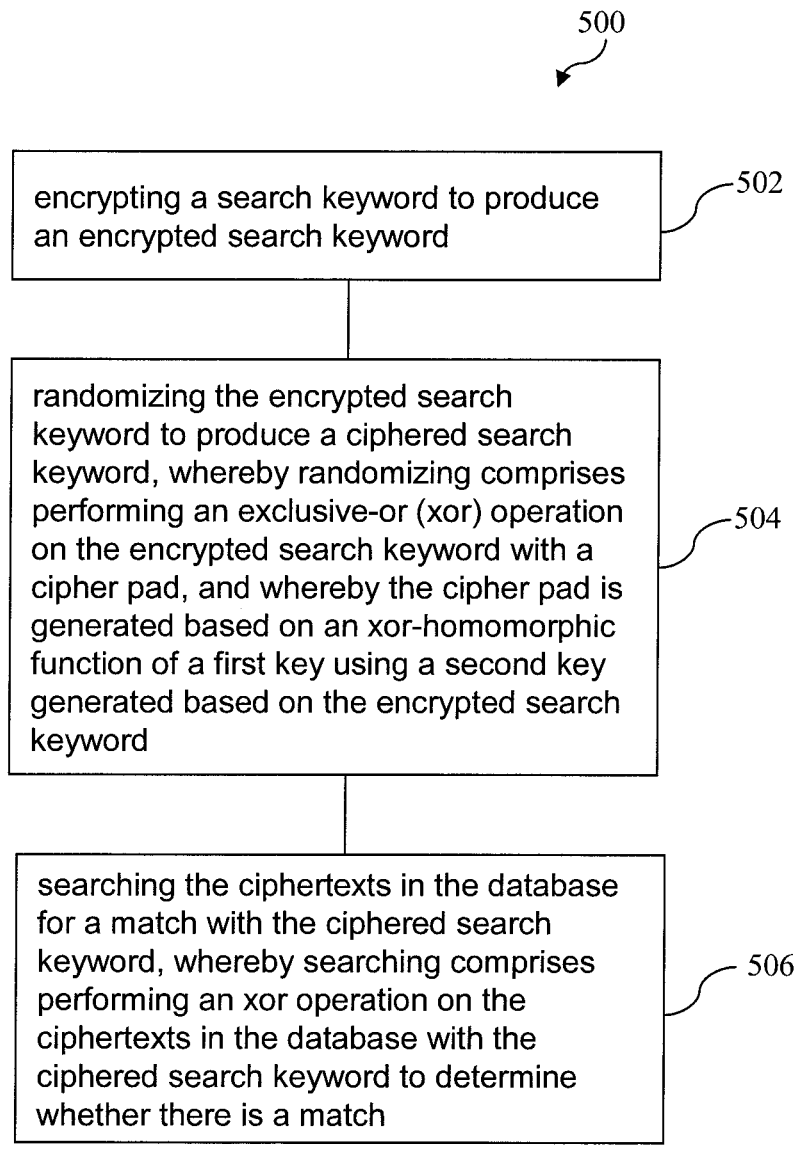
FIG. 5 depicts an overview of a method of searching ciphertexts in a database according to an embodiment of the present invention.

FIG. 5 depicts an overview of a method 500 of searching ciphertexts in a database according to an embodiment of the present invention. The method 500 comprises a step 502 of encrypting a search keyword to produce an encrypted search keyword, a step 504 of randomizing the encrypted search keyword to produce a ciphered search keyword, and a step 506 of searching the ciphertexts in the database for a match with the ciphered search keyword. In particular, the randomizing process comprises performing an exclusive-or (xor) operation on the encrypted search keyword with a cipher pad, and the cipher pad is generated based on an xor-homomorphic function of a first key using a second key generated based on the encrypted search keyword. The searching comprises performing an xor operation on the ciphertexts in the database with the ciphered search keyword to determine whether there is a match.

In an example embodiment, the search keyword is encrypted and randomized in the same manner as the input data 310 as described hereinbefore with reference to FIG. 3. In particular, an xor operation is performed on the encrypted keyword to be searched and a cipher pad, the cipher pad being generated based on the first or session key for the search keyword and is imbued with a special structure which is preserved after xor operations as the structure is xor-homomorphic. As the cipher pad and the encrypted search keyword data are xor-ed together to produce a randomized ciphered search keyword, this advantageously prevents any eavesdropper or man-in-the-middle from getting any information about the keyword by analyzing the traffic for example.

For a better understanding, the method 500 will now be described more fully with reference to FIG. 6, in which an exemplary embodiment of the invention is shown. This invention may, however, be embodied in many different forms and should not be construed as limited to the exemplary embodiment shown in FIG. 6. Rather, the exemplary embodiment is provided so that this disclosure will be thorough and complete, and will fully convey the scope of the invention to those skilled in the art.

Figure 6:
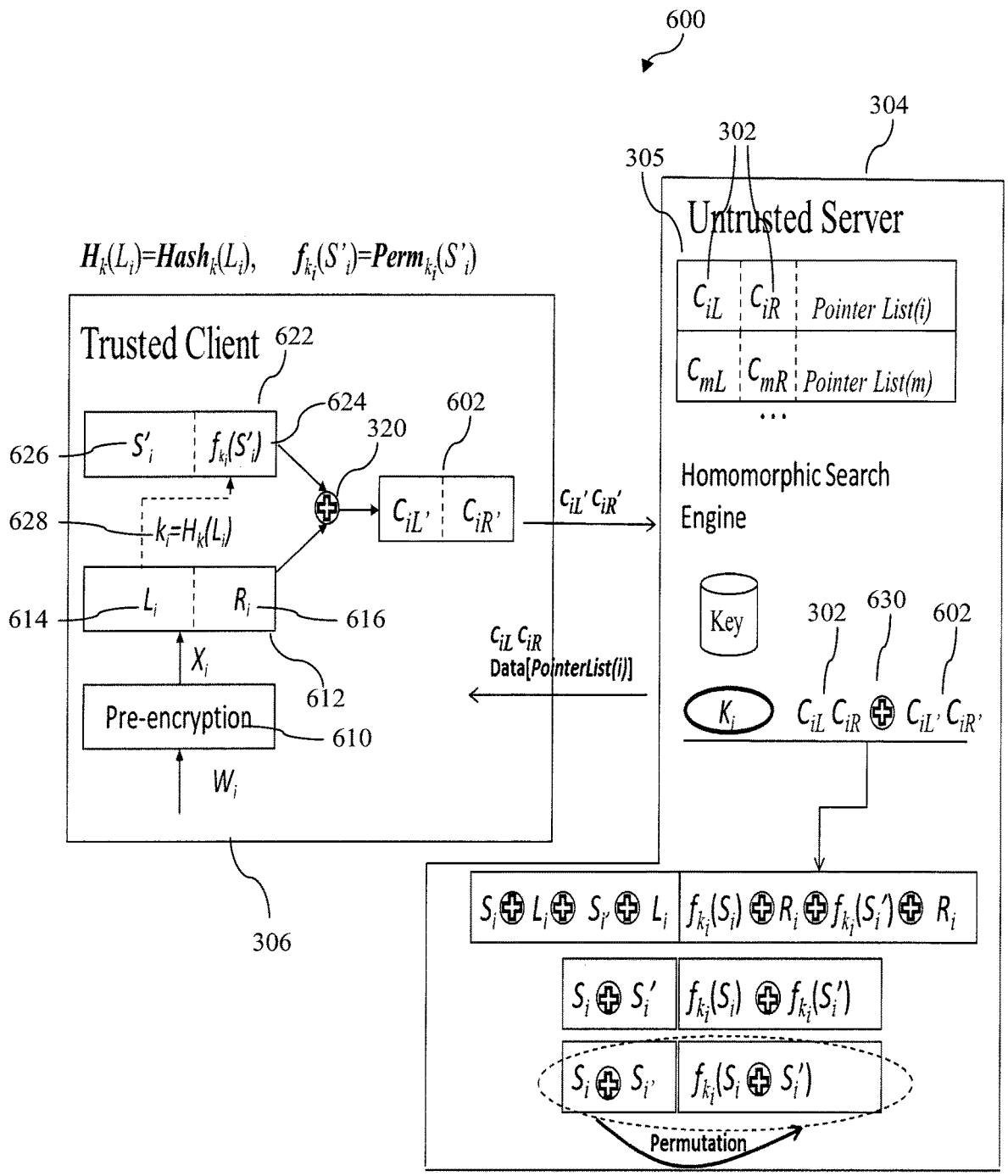
FIG. 6 depicts a schematic block diagram of a method of searching ciphertexts in a database according to an embodiment of the present invention.

FIG. 6 depicts a schematic block diagram of a method 600 of searching ciphertexts ($C_{iL}+C_{iR}, \ldots, C_{mL}+C_{mR}$) 302 in a database 305 according to an embodiment of the present invention. In the example embodiment, a ciphered search keyword 602 is generated at a trusted client 306 and then used for searching ciphertexts 302 stored in a database 305 at an untrusted server 304. As with the input data 310 described in FIG. 3, two levels of data protection (encryption and randomization) are implemented on the search keyword 610 before the search keyword is used for searching ciphertexts 302 in the database 305 at the untrusted server 304.

As illustrated in FIG. 6, the search keyword 610 is encrypted to produce an encrypted search keyword 612, which is partitioned into a first or left portion 614 of (m-n)-bit and a second or right portion 616 of m-bit. Preferably, a deterministic symmetric encryption technique (e.g., AES-256) is used to secure the privacy of the search keyword and ensure that the encrypted search keyword is constant (i.e., the same ciphertext for a given plaintext and key), thus allowing the encrypted search keyword 612 to be used in a part of the randomization process. The encrypted search keyword 612 is then randomized to produce the ciphered search keyword 602.

The randomization process includes performing an xor operation 320 on the encrypted search keyword 612 with a cipher pad 622. The cipher pad 622 is generated based on an xor-homomorphic function (e.g., $f_{k_i}$) 624 of a first or session key (e.g., $S_{i'}$) 626 using a second or permutation key (e.g., $k_i$) 328 generated based on the encrypted search keyword 612. The cipher pad 622 includes two portions or parts: a first or left portion being the first key (e.g., a random number) 626 and a second or right portion being the output of the xor-homomorphic function 624 with inputs of the session key 626 and the permutation key 328. For example, the permutation key 628 is generated based on a hash function or a circular shift function of a portion of the encrypted search keyword 612. In an embodiment, the first key (left portion) 626 may be concatenated with the output of the xor-homomorphic function 624 of the first key 626. In various embodiments, the xor-homomorphic function 624 may be a pseudorandom bit-permutation function or a circular shift function. In the example embodiment of FIG. 6, the xor-homomorphic function 624 is a pseudorandom bit-permutation function ($Perm_{k_i}$). The first key 626 is a session key for the input search keyword 610 and may be a pseudorandom number.

As illustrated in the example embodiment of FIG. 6, the permutation key 628 is generated based on a hash function ($H_k$) of a left portion 614 of the encrypted search keyword 612. The hash function ($H_k$) can be a one-way function with a key k or a pseudo random function with a random seed of k. Accordingly, the cipher key 622 may be created by hashing the left portion 614 of the encrypted search keyword 312 with the permutation key 628 to be used as a seed in performing a pseudorandom bit-permutation on the session key 626, and the output of the pseudorandom bit-permutation function 624 is concatenated with the session key 626.

Therefore, each search keyword is randomized with a current session key 626 to convert a deterministic encrypted keyword into a different form every session for enhancing data security level. With this functionality, it is possible to eliminate man-in-the-middle or untrusted server attacks on ciphertext statistics and maintain the privacy of the stored data at an untrusted server. This retains the lightweight secure search evaluation process by introducing xor-homomorphic functions to let the server search on encrypted keywords without additional information about the ciphertext. For example, as illustrated in FIG. 6, searching the ciphertexts 302 in the database 305 for a match includes performing an xor operation 630 on the ciphertexts 302 in the database 305 with the ciphered search keyword 602 to determine whether there is a match. For example, if there is a match, the xor operation 630 will eliminate same item ($L_i$ and $R_i$) and obtain the result as $S_i \oplus S_{i'}$, contacting $f_{ki}(S_1) \oplus f_{ki}(S_{i'})$. Since the function $f(.)$ is homomorphic xor function, $f_{ki}(S_1) \oplus f_{ki}(S_{i'}) = f_{ki}(S_1 \oplus S_{i'})$. The untrusted server 304 knows $S_i \oplus S_{i'}$ and the permutation key $K_i$ 628. Accordingly, if the permutation of $S_i \oplus S_{i'}$ equals to the right part (i.e., $f_{ki}(S_1) \oplus f_{ki}(S_{i'})$), there is a match. Otherwise, there is not a match.

Figure 7:
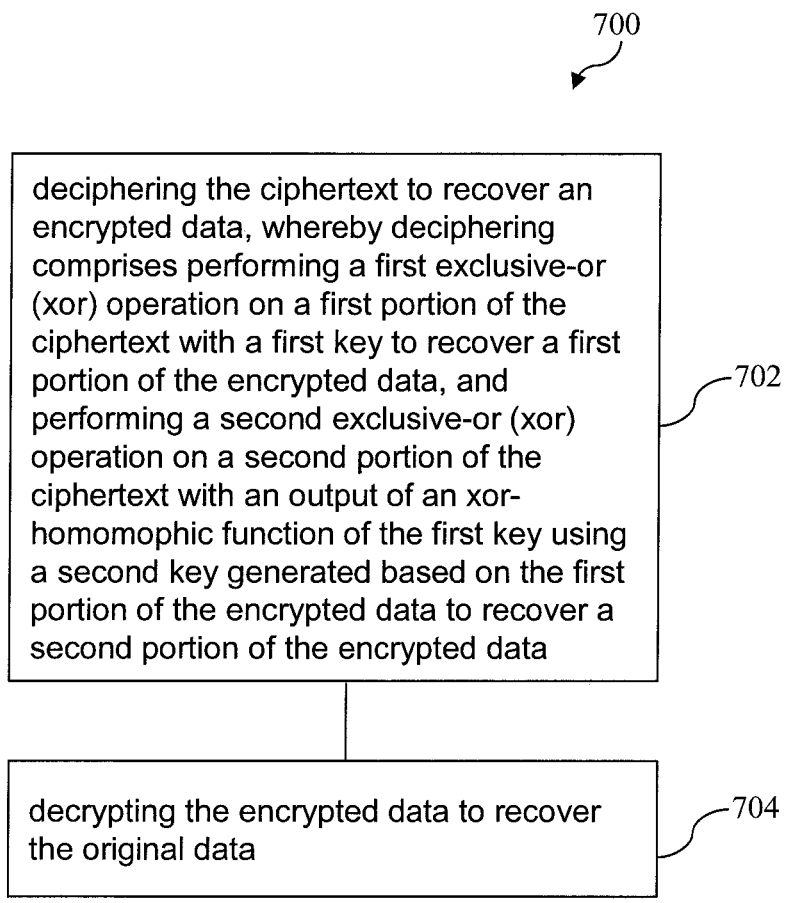
FIG. 7 depicts an overview of a method of decrypting a ciphertext to recover an original data according to an embodiment of the present invention.

If there is a match in the data stored at the server 304, the data is returned to the client 306 as a ciphertext and the ciphertext can be decrypted by the client 306 to recover the original data. FIG. 7 depicts an overview of a method 700 of decrypting a ciphertext 302 to recover an original data according to an embodiment of the present invention. The method 700 comprises a step 702 of deciphering the ciphertext to recover an encrypted data, and a step 704 of decrypting the encrypted data to recover the original data. In particular, the step 702 of deciphering comprises performing a first exclusive-or (xor) operation on a first portion of the ciphertext with a first key to recover a first portion of the encrypted data, and performing a second exclusive-or (xor) operation on a second portion of the ciphertext with an output of an xor-homomorphic function of the first key using a second key generated based on the first portion of the encrypted data to recover a second portion of the encrypted data.

For a better understanding, the method 700 will now be described more fully with reference to FIG. 8, in which an exemplary embodiment of the invention is shown. This invention may, however, be embodied in many different forms and should not be construed as limited to the exemplary embodiment shown in FIG. 8. Rather, the exemplary embodiment is provided so that this disclosure will be thorough and complete, and will fully convey the scope of the invention to those skilled in the art.

Figure 8:
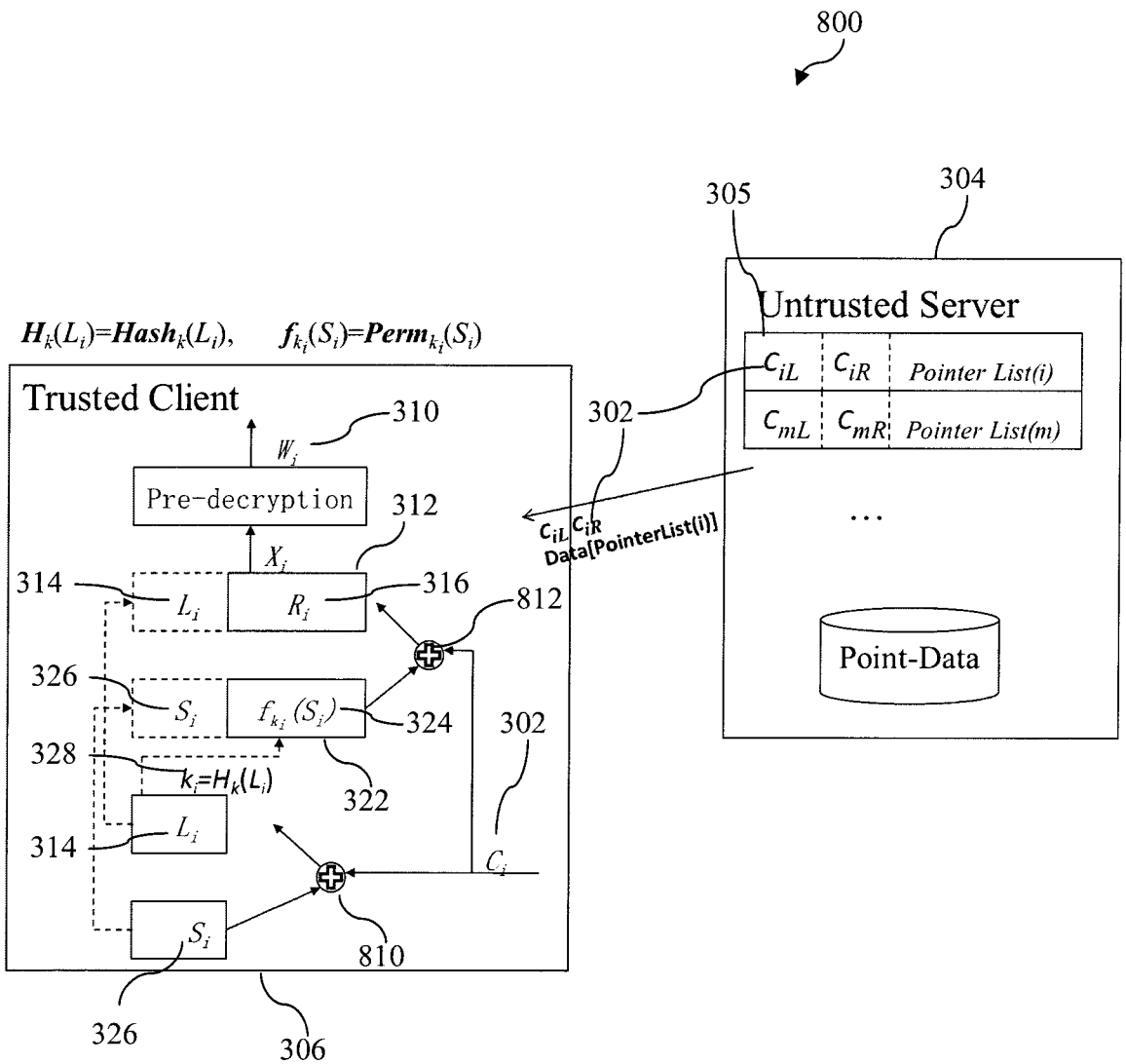
FIG. 8 depicts a schematic block diagram of a method of decrypting a ciphertext obtained from an untrusted server to recover an original data according to an example embodiment of the present invention.

FIG. 8 depicts a schematic block diagram of a method 800 of decrypting a ciphertext 302 obtained from an untrusted server 304 to recover an original data 310 according to an example embodiment of the present invention. As a first step, the ciphertext 302 retrieved is deciphered to recover an encrypted data 324. As illustrated, the deciphering comprises performing a first exclusive-or (xor) operation 810 on a first or left portion of the ciphertext 302 with a first or session key ($S_i$) 326 to recover a first portion ($L_i$) 314 of the encrypted data 312, and performing a second exclusive-or (xor) operation 812 on a second or right portion of the ciphertext 302 with an output of an xor-homomorphic function 324 of the first key 326 using a second or permutation key ($k_i$) 328 generated based on the first portion 314 of the encrypted data 312 to recover a second portion ($R_i$) 316 of the encrypted data 312.

In the example embodiment of FIG. 8, the first key 326 can be a stored random number at the trusted client 306. The left portion 314 of the encrypted data 312 is hashed to obtain the second key 328 for the xor-homomorphic function ($f_{k_i}$) 324, which in the example embodiment is a pseudorandom bit-permutation function. The first key 326 is permuted and the second xor operation 812 is performed on the output of the pseudorandom bit-permutation of the first key 326 with the right portion of the ciphertext 302 to obtain the right portion 316 of the encrypted data 312. The encrypted data 312 is thus obtained and then decrypted to yield the original data 310.

As mentioned hereinbefore, this invention may be embodied in many different forms and should not be construed as limited to the exemplary embodiments as described hereinbefore (e.g., FIGS. 3, 6 and 8). By way of an example only, a further exemplary embodiment of the present invention will now be described illustrating a modification that may be made to the exemplary embodiments disclosed hereinbefore.

In the example embodiments as described hereinbefore, the second or permutation key 328 is shared with the untrusted server (e.g., shared cloud server) 304 in order to perform secure searching at the untrusted server 304. In a further embodiment, the permutation key is advantageously computed on-demand (i.e., computable at the server 304 without requiring it to be provided by the trusted client 306) at the untrusted server 304, thus eliminating the need to store the permutation key at the untrusted server 304.

Figure 9:
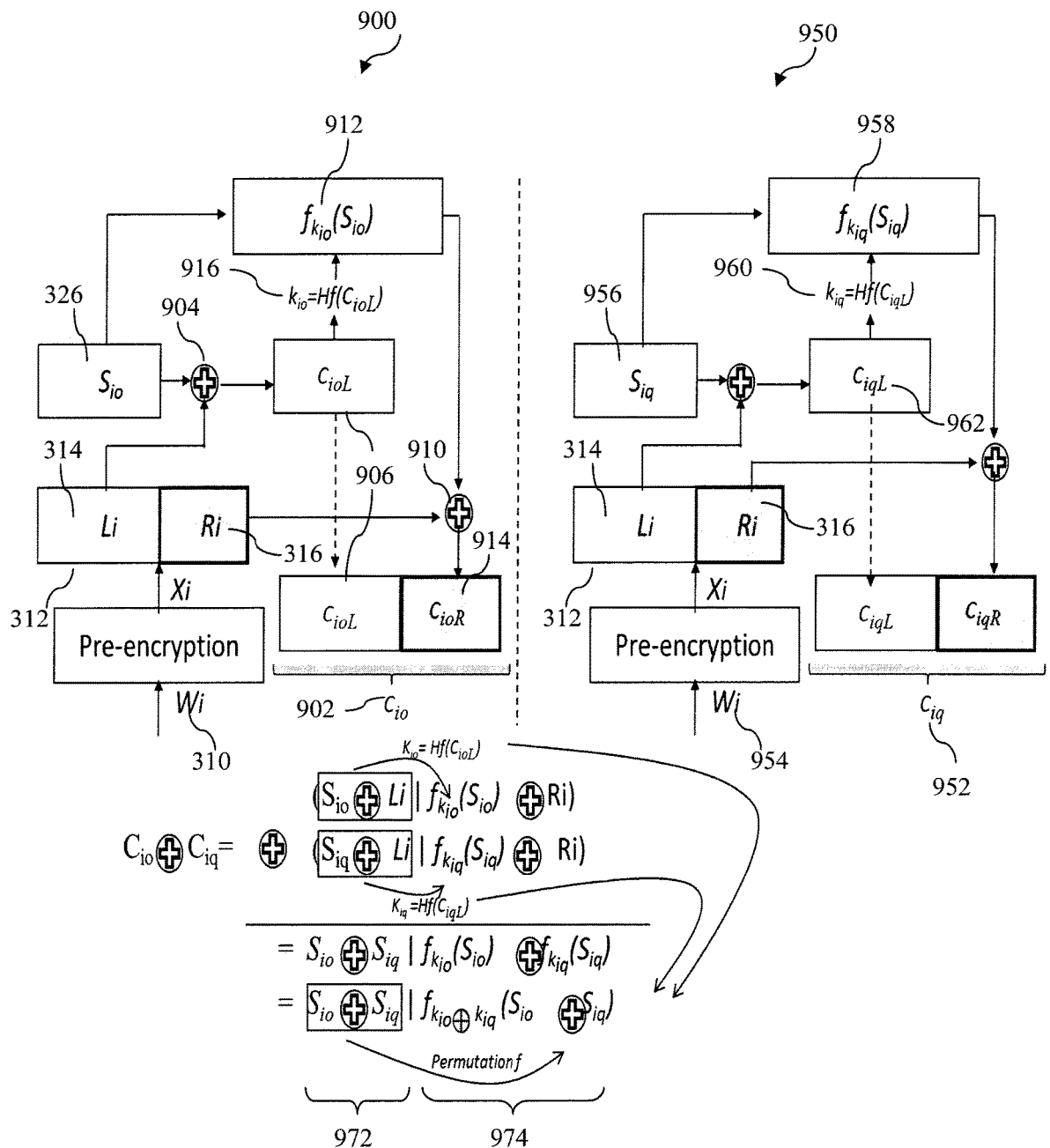
FIG. 9 depicts a schematic block diagram of a method of generating a ciphertext according to a further embodiment of the present invention.

FIG. 9 depicts a schematic block diagram of a method 900, 950 of generating a ciphertext according to the further embodiment of the present invention for an initial upload session 'o' and a later keyword query/search session 'q'. In general, FIG. 9 shows the principle of secure searching with computable permutation key. The left side of FIG. 9 shows the generation of the ciphertext $C_{i_o}$ 902 at the initial session based on an input keyword $W_i$ 310. As shown, the keyword $W_i$ 310 is encrypted into $X_i$ 312 comprising a left portion (n-m)-bit ($L_i$) 314 and a right portion m-bit ($R_i$) 316 in the same manner as, for example, described hereinbefore with reference to FIG. 3. Subsequently, the encrypted keyword 312 is randomized using a cipher or permutation key pad in a manner different to the embodiments described hereinbefore. In particular, according to this embodiment, performing an xor operation on the encrypted data 312 with a cipher pad comprises performing a first xor operation 904 on a first portion 314 of the encrypted data 312 with the first key 326 to produce a first portion 906 of the ciphertext 902, and performing a second xor operation 910 on a second portion 316 of the encrypted data 312 with the output of the xor-homomorphic function 912 of the first key 326 to produce a second portion 914 of the ciphertext 902. In particular, the second key 916 for the xor-homomorphic function 912 is generated based on the first portion 906 of the ciphertext 902 (which has was generated above based on the first key 326 and the first portion 314 of the encrypted data 312).

The method 900 will now be described further with reference to the example embodiment of FIG. 9. As can be seen, the cipher or permutation key pad includes two parts, an (n-m)-bit random number $S_{io}$ 326 contacting with the m-bit permutation result of homomorphism xor function $f(\ )$ 912, as $S_{io} + f_{kio}(S_{io})$. It can also be seen that the permutation key $K_{io}$ 916 is generated using another homomorphism xor function Hf( ) of the left portion (n-m) bit 906 of the ciphertext 902, that is, $K_{io} = Hf(C_{ioL})$. That is, the relationship between the permutation key 916 and the left portion 906 of the ciphertext is the homomorphic xor function Hf( ) As an example, the right side of FIG. 9 illustrates a method of generating a ciphertext 952 for a keyword search at a 'q' session. The search keyword 954 is encrypted and ciphered in the same manner as shown in the left side of FIG. 9 but with a different cipher pad and a different random number 956. The cipher pad is also made up of an (n-m)-bit random number $S_{iq}$ 956 contacting the m-bit permutation result of homomorphism xor function $f(\ )$ 958, i.e., $S_{iq} + f_{kiq}(S_{iq})$. As can be appreciated, the relationship between the permutation key 960 and the (n-m)-bit left portion 962 of the ciphertext 952 is also the homomorphic xor function Hf( ), with $K_{iq} = Hf(C_{iqL})$. With the ciphered search keyword 952 during the 'q'-th encrypted session query, the untrusted server 304 is operable to compare each previously stored keyword entry with the ciphered search keyword 952 for a match using an XOR operation. By way of an example, the XOR result of the 'o'-th ciphered keyword entry 902 and 'q'-th ciphered keyword 952 is shown at the bottom of in FIG. 9. In this regard, if they are the same keyword, the XOR result will keep a permutation relationship between the (n-m)-bit left portion 972 and the m-bit right portion 974 (since as explained above, the relationship between the permutation key and the (n-m) left portion 962 bit of the ciphertext is the homomorphic xor function Hf(.)). Otherwise, the keyword is not matched.

Figure 10:
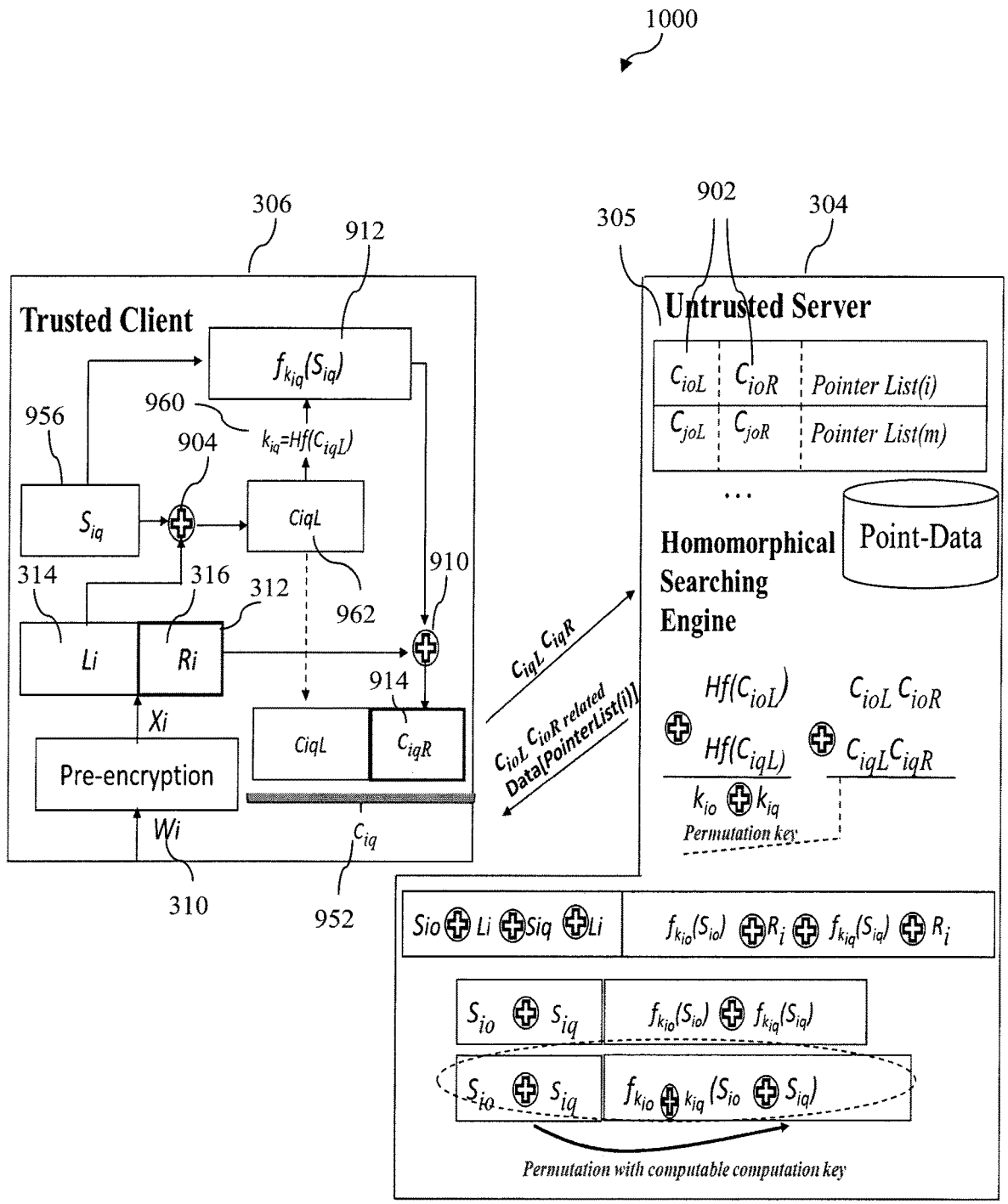
FIG. 10 depicts a schematic block diagram of a method of searching ciphertexts in a database according to the further embodiment of the present invention.

FIG. 10 depicts a schematic block diagram of a method of searching ciphertexts 902 in a database 305 according to the further embodiment of the present invention. As shown in FIG. 10, the untrusted server 304 has a secure keyword list stored in a database 305 comprises a plurality of ciphered keywords 902. Each ciphered keyword query 952 from clients 306 will be compared (i.e., xor-ed) with an entry in the list to evaluate whether they match or not. According to the further embodiment, it can be appreciated that the permutation key can be computed on-demanded, instead of requiring it to be stored at the server such as in the method of FIG. 3. This further enhances data privacy leakage against the untrusted server, and minimizes private key sharing with the untrusted server 304.

Figure 11:
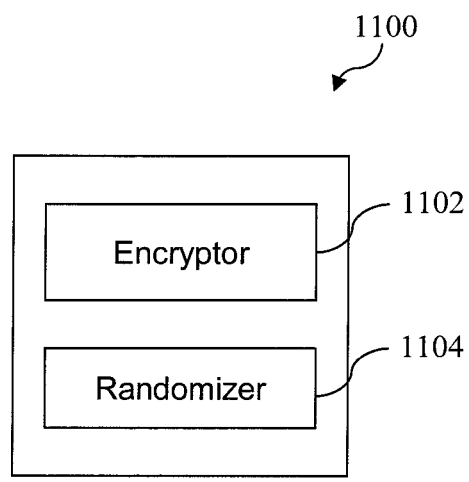
FIG. 11 depicts a schematic block diagram of a system for generating a ciphertext according to an embodiment of the present invention, corresponding to the method of generating a ciphertext as shown in FIG. 2.

According to an embodiment, there is provided a system 1100 for generating a ciphertext, corresponding to the method 200 of generating a ciphertext as described hereinbefore with reference to FIG. 2. As schematically depicted in FIG. 11, the system comprises an encryptor 1102 configured to encrypt an input data to produce an encrypted data, and a randomizer 1104 configured to randomize the encrypted data to produce the ciphertext. In particular, the randomizer 1106 is configured to perform an exclusive-or (xor) operation on the encrypted data with a cipher pad, and whereby the cipher pad is generated based on a first xor-homomorphic function of a first or session key using a second or permutation key generated based on the encrypted data.

Figure 12:
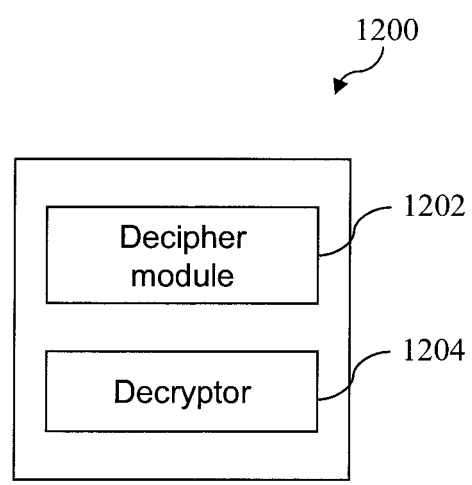
FIG. 12 depicts a schematic block diagram of a system for decrypting a ciphertext to recover an original data according to an embodiment of the present invention, corresponding to the method of decrypting a ciphertext as shown in FIG. 7.

According to an embodiment of the present invention, there is provided a system 1200 for decrypting a ciphertext to recover an original data, corresponding to the method 700 of decrypting a ciphertext as described hereinbefore with reference to FIG. 7. As schematically depicted in FIG. 12, the system 1200 comprises a decipher module 1202 configured to decipher the ciphertext to recover an encrypted data, and a decryptor 1204 configured to decrypt the encrypted data to recover the original data. In particular, the decipher module 1202 is configured to perform a first exclusive-or (xor) operation on a first portion of the ciphertext with a first or session key to recover a first portion of the encrypted data, and to perform a second exclusive-or (xor) operation on a second portion of the ciphertext with an output of a first xor-homomorphic function of the first key using a second or permutation key generated based on the first portion of the encrypted data to recover a second portion of the encrypted data.

Figure 13:
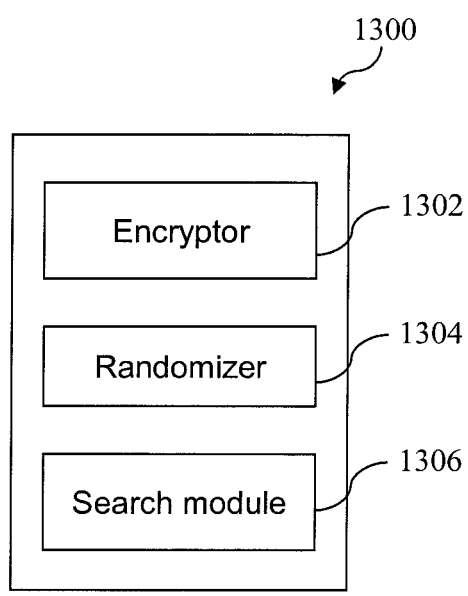
FIG. 13 depicts a schematic block diagram of a system for searching ciphertexts in a database according to an embodiment of the present invention, corresponding to the method of searching ciphertexts in a database as shown in FIG. 5.

According to an embodiment of the present invention, there is provided a system 1300 for searching ciphertexts in a database, corresponding to the method 500 of searching ciphertexts in a database as described hereinbefore with reference to FIG. 5. As schematically depicted in FIG. 13, the system 1300 comprises an encryptor 1302 configured to encrypt a search keyword to produce an encrypted search keyword, a randomizer 1304 configured to randomize the encrypted search keyword to produce a ciphered search keyword, and a search module 1306 configured to search the ciphertexts in the database for a match with the ciphered search keyword. In particular, the randomizer 1304 is configured to perform an exclusive-or (xor) operation on the encrypted search keyword with a cipher pad, whereby the cipher key is generated based on an xor-homomorphic function of a first or session key using a second or permutation key generated based on the encrypted search keyword. The search module 1306 is configured to perform an xor operation on the ciphertexts in the database with the ciphered search keyword to determine whether there is a match.

It will be appreciated to a person skilled in the art that the above-described components of the systems 1100, 1200, 1300, including the encryptor 1102 and the randomizer 1104 of the system 1100, the decipher module 1202 and the decryptor 1204 of the system 1200, and the encryptor 1302, the randomizer 1304 and the search module 1306 of the system 1300 may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

According to an embodiment of the present invention, there is provided a computer program product, embodied in a computer-readable storage medium, comprising instructions executable by a computer processor to perform a method of generating a ciphertext according to the method 200 of generating a ciphertext as described hereinbefore with reference to FIG. 2.

According to an embodiment of the present invention, there is provided a computer program product, embodied in a computer-readable storage medium, comprising instructions executable by a computer processor to perform a method of searching ciphertext in a database according to the method 500 as described hereinbefore with reference to FIG. 5.

According to an embodiment of the present invention, there is provided a computer program product, embodied in a computer-readable storage medium, comprising instructions executable by a computer processor to perform the method 700 of decrypting a ciphertext as described hereinbefore with reference to FIG. 7.

Some portions of the description are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Figure 14:
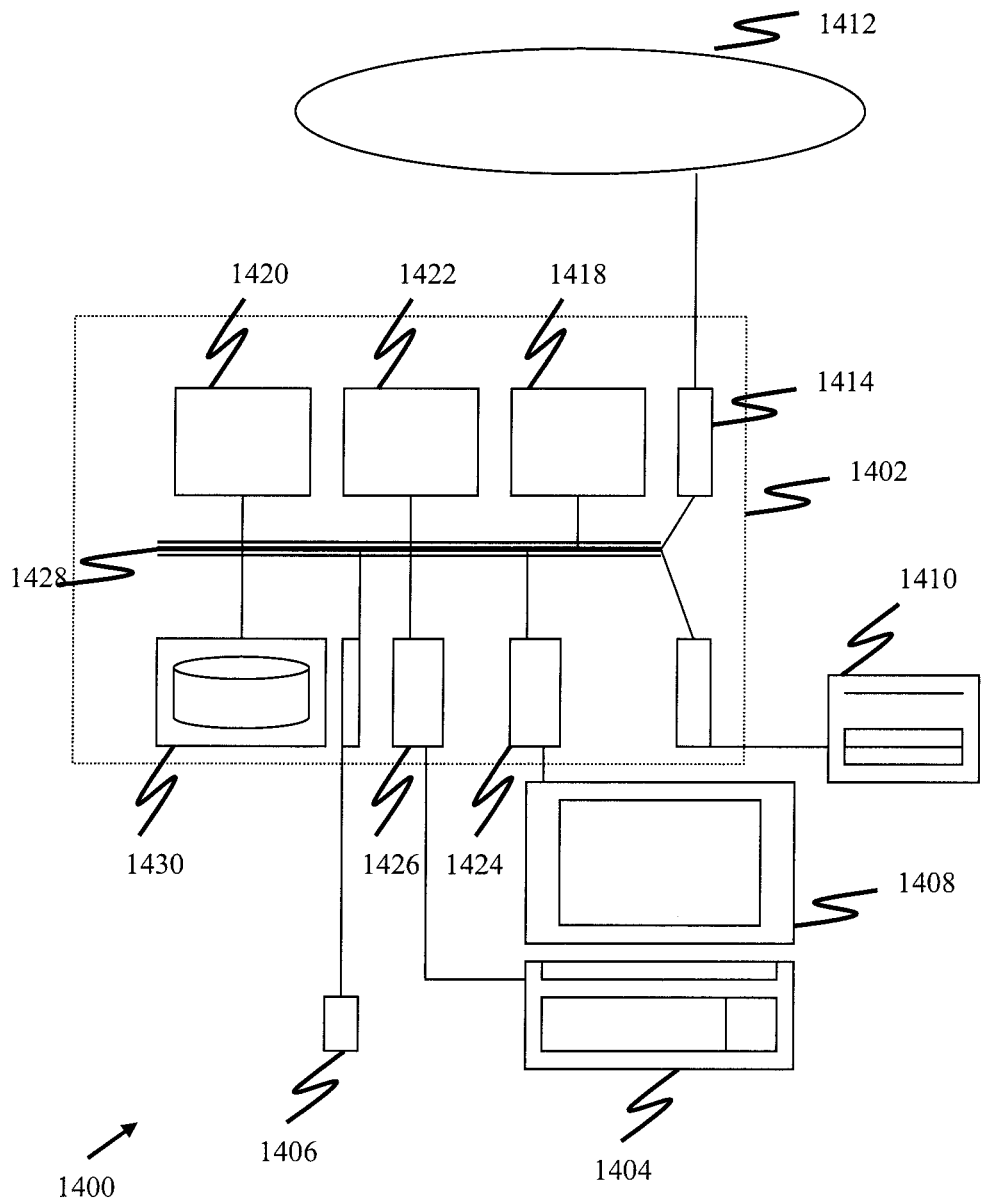

The methods or functional modules of the various example embodiments as described hereinbefore can be implemented on a computer system 1400, schematically shown in FIG. 14 as an example only. The method or functional module may be implemented as software, such as a computer program being executed within the computer system 1400, and instructing the computer system 1400 to conduct the method of the example embodiment. The computer system 1400 may comprise a computer module 1402, input modules such as a keyboard 1404 and mouse 1406 and a plurality of output devices such as a display 1408, and a printer 1410. The computer module 1402 may be connected to a computer network 1412 via a suitable transceiver device 1414, to enable access to e.g. the Internet or other network systems such as Local Area Network (LAN) or Wide Area Network (WAN). The computer module 1402 in the example may include a processor 1418 for executing various instructions, a Random Access Memory (RAM) 1420 and a Read Only Memory (ROM) 1422. The computer module 1402 may also include a number of Input/Output (I/O) interfaces, for example I/O interface 1424 to the display 1408, and I/O interface 1426 to the keyboard 1404. The components of the computer module 1402 typically communicate via an interconnected bus 1428 and in a manner known to the person skilled in the relevant art.

FIGS. 15A and 15B show the results on an experiment conducted to compare the performance of a conventional method of searching ciphertexts and a method of searching ciphertexts in a database according to an example embodiment of the present invention. For this experiment, the conventional searching technique used is disclosed in Song et. al, "*Practical Techniques For Searches On Encrypted Data,*" in Proc. Of IEEE Symposium on Security and Privacy, 2000, p. 44, the content of which being hereby incorporated by reference in its entirety for all purposes. In FIG. 15A, it can be observed that the conventional method does not provide session protection and the same data is always encrypted into the same ciphertext. For example, the same keyword "Merck's" is encrypted into the same ciphertexts 1502 in separate sessions. This leaves the conventional method vulnerable to ciphertext analysis attacks by, for example, a man-in-the-middle. According to embodiments of the present invention as described hereinbefore, session protection is provided. Therefore, the same keyword results in different ciphertexts in different sessions. For example, as illustrated in the example of FIG. 15B, the same keyword "Merck's" is encrypted into different ciphertexts 1512. In addition, by comparing the time taken to search the data in the server (circled in FIGS. 15A and 15B), it can be observed that the present method is significantly faster than the conventional method.

Table 1 below shows the performance tests on the time taken to search the ciphertexts in the database between the present method and the conventional method.

TABLE 1

Performance tests on the time taken
to search the ciphertexts in the database

| Found location | Searching time (µs) | |
|---|---|---|
|  | Present Method | Conventional Method |
| 2500 | 3504/3524 | 4941/4947 |
| 5000 | 6984/6995 | 9913/9989 |
| 7500 | 10398/10572 | 14826/14913 |
| 10000 | 13955/13958 | 20032/20036 |
| Negative | 14032 | 19769 |

From Table 1, it can be appreciated that the advantage of the present method further is even greater if the keyword is deeper down in the list to be searched. It can also be appreciated that although the present method may add an additional overhead of about 880-900 microseconds to the processing in an example, this is negligible compared to the time taken to search on the server side, which may be about 14 seconds for a list of 10 000 words for example.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computer-implemented method of generating a ciphertext, the method comprising:
encrypting, by a first computer processing system, an input data to produce an encrypted data; and
randomizing the encrypted data to produce the ciphertext prior to providing the ciphertext to a second computer processing system,
wherein said randomizing comprises performing, by the first computer processing system, an exclusive-or (xor) operation on the encrypted data with a cipher pad, and wherein the cipher pad is generated by the first computer processing system based on an xor-homomorphic function of a first key using a second key generated based on the encrypted data,
wherein said performing the xor operation on the encrypted data with the cipher pad comprises performing a first xor operation on a first portion of the encrypted data with the first key to produce a first portion of the ciphertext, and performing a second xor operation on a second portion of the encrypted data with the output of the xor-homomorphic function of the first key to produce a second portion of the ciphertext,
wherein the second key for the xor-homomorphic function is generated based on the first portion of the ciphertext.

2. The method according to claim 1, wherein the cipher pad comprises the first key and an output of the xor-homomorphic function of the first key.

3. The method according to claim 1, wherein the first key is a session key for the input data, the session key being a pseudorandom number.

4. The method according to claim 1, wherein the xor-homomorphic function is a pseudorandom bit-permutation function or a circular shift function.

5. The method according to claim 1, wherein the second key for the xor-homomorphic function is generated based on a hash function or a circular shift function of the first portion of the ciphertext.

6. A system for generating a ciphertext, the system comprising:
a memory to store one or more processor executable instructions; and
a processor, coupled with the memory, configure to execute the one or more instructions to:
encrypt an input data to produce an encrypted data, and
randomize the encrypted data to produce the ciphertext prior to providing the ciphertext to a second computer processing system,
wherein randomizing the encrypted data comprises the processor performing an exclusive-or (xor) operation on the encrypted data with a cipher pad, and wherein the cipher pad is generated by the system based on an xor-homomorphic function of a first key using a second key generated based on the encrypted data,
wherein performing the xor operation on the encrypted data with the cipher pad comprises the processor performing a first xor operation on a first portion of the encrypted data with the first key to produce a first portion of the ciphertext, and performing a second xor operation on a second portion of the encrypted data with the output of the xor-homomorphic function of the first key to produce a second portion of the ciphertext, and wherein the second key for the xor-homomorphic function is generated based on the first portion of the ciphertext.

7. The system according to claim 6, wherein the cipher pad comprises the first key and an output of the first xor-homomorphic function of the first key.

8. The system according to claim 6, wherein the first key is a session key for the input data, the session key being a pseudorandom number.

9. The system according to claim 6, wherein the xor-homomorphic function is a pseudorandom bit-permutation function or a circular shift function.

10. The system according to claim 6, wherein the second key for the xor-homomorphic function is generated based on a hash function or a circular shift function of the first portion of the ciphertext.

* * * * *